(12) United States Patent
Govil et al.

(10) Patent No.: US 11,558,385 B2
(45) Date of Patent: Jan. 17, 2023

(54) AUTOMATIC TRANSACTION PROCESSING FAILOVER

(71) Applicant: Capital One Services, LLC, McLean, VA (US)

(72) Inventors: Lavangana Govil, Glen Allen, VA (US); David J. Hicks, Glen Allen, VA (US); Harinath R. Nallabolu, Glen Allen, VA (US); Ranvirsinh Raol, Glen Allen, VA (US); Srinivas Alladi, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 203 days.

(21) Appl. No.: 17/135,531

(22) Filed: Dec. 28, 2020

(65) Prior Publication Data
US 2021/0119998 A1   Apr. 22, 2021

Related U.S. Application Data

(63) Continuation of application No. 16/674,888, filed on Nov. 5, 2019, now Pat. No. 10,911,459, which is a continuation of application No. 16/515,400, filed on Jul. 18, 2019, now Pat. No. 10,574,657.

(51) Int. Cl.
*H04L 9/40* (2022.01)
*G06F 9/46* (2006.01)
*H04L 1/22* (2006.01)

(52) U.S. Cl.
CPC .............. *H04L 63/10* (2013.01); *G06F 9/466* (2013.01); *H04L 1/22* (2013.01)

(58) Field of Classification Search
CPC . H04L 63/10; H04L 1/22; H04L 67/61; H04L 63/108; G06F 9/466; G06F 9/505
See application file for complete search history.

(56) References Cited

U.S. PATENT DOCUMENTS

| | | |
|---|---|---|
| 7,757,236 B1 | 7/2010 | Singh |
| 8,037,364 B2 | 10/2011 | Kern et al. |
| 8,401,968 B1 * | 3/2013 | Schattauer ............. G06Q 30/06 705/37 |

(Continued)

*Primary Examiner* — Beemnet W Dada
(74) *Attorney, Agent, or Firm* — Banner & Witcoff, Ltd.

(57) ABSTRACT

Transaction authorization systems may include a transaction processor and an authorization server system. The transaction processor obtains transaction requests authorizations for those requests from the authorization server system. The transaction processor may require an authorization be provided within a threshold time; otherwise, the transaction may be processed without authorization. The authorization server system may be hosted using one or more nodes in a distributed system. Degradation of the performance of the distributed system may cause the performance of the authorization server system to fall below the required performance threshold and transactions may not be authorized before automatic processing. Transaction authorization systems may monitor the health of the individual nodes and/or the distributed system and automatically adjust the routing of authorizations based on current and/or future performance degradation. The transaction authorization system may also allocate additional resources and/or reroute authorizations to a separate distributed system to avoid performance degradations.

20 Claims, 5 Drawing Sheets

(56) References Cited

U.S. PATENT DOCUMENTS

| | | |
|---|---|---|
| 8,554,129 B2 | 10/2013 | Timbadia et al. |
| 9,641,880 B1 | 5/2017 | Scurtu et al. |
| 10,574,657 B1 | 2/2020 | Govil et al. |
| 2002/0095489 A1 | 7/2002 | Yamagami |
| 2004/0199815 A1 | 10/2004 | Dinker et al. |
| 2005/0262104 A1 | 11/2005 | Robertson et al. |
| 2005/0268156 A1 | 12/2005 | Mashayekhi et al. |
| 2008/0288212 A1 | 11/2008 | Greifeneder |
| 2011/0214007 A1 | 9/2011 | Sreenivasan et al. |
| 2011/0225337 A1 | 9/2011 | Byrne et al. |
| 2011/0280258 A1* | 11/2011 | Klingen .............. H04L 41/0816 370/437 |
| 2012/0117417 A1 | 5/2012 | Graham et al. |
| 2013/0159762 A1 | 6/2013 | Chiu et al. |
| 2014/0173341 A1 | 6/2014 | Kern et al. |
| 2015/0032486 A1 | 1/2015 | Francois et al. |
| 2015/0277964 A1* | 10/2015 | Atkins ................... H04L 67/01 718/101 |
| 2020/0111075 A1* | 4/2020 | Singhal ................. G06Q 20/40 |
| 2022/0272104 A1* | 8/2022 | Yamanakajima ....... G06F 21/35 |

\* cited by examiner

AUTOMATIC TRANSACTION PROCESSING FAILOVER

CROSS-REFERENCE TO RELATED APPLICATIONS

The instant application is a continuation of U.S. patent application Ser. No. 16/674,888, titled "Automatic Transaction Processing Failover" and filed Nov. 5, 2019, which is a continuation of U.S. patent application Ser. No. 16/515,400, titled "Automatic Transaction Processing Failover," filed Jul. 18, 2019, and issued as U.S. Pat. No. 10,574,657, the disclosures of which are hereby incorporated by reference in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to transaction processing and more specifically to transaction processing using cloud-based authorizations.

BACKGROUND

Payment processors typically handle transaction processing for one or more financial institutions. Many payment processors provide authorization and settlement services and/or initiate fund transfers between payment processors and financial institutions. Once the payment processor receives an approval (or denial) of a requested transaction, the approval of the transaction may be relayed to the financial institution which may then complete the transaction according to the authorization instructions.

Aspects described herein may address these and other problems, and generally improve the quality, efficiency, and speed of transaction processing systems by offering improved system availability by dynamically rerouting authorization services, particularly in cloud-based environment.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Transaction authorization systems in accordance with aspects of the invention may process authorizations for a variety of transactions. Transaction authorization systems may include a transaction processor and an authorization server system. The transaction processor obtains transaction requests from client devices and authorizations for those requests from the authorization server system. In many embodiments, the transaction processor requires the authorization server system to provide an authorization within a threshold time period; otherwise, the transaction processor will process the transaction without authorization. The authorization server system may include a variety of components to process different aspects of a transaction authorization request. In several embodiments, the authorization server system is hosted using one or more processing nodes in a distributed system, such as a cloud-based processing system. Degradation of the performance of the distributed system and/or individual processing nodes may cause the performance of the authorization server system to fall below the requirements of the transaction processor, and therefore the authorization server system will not be able to authorize transactions before the transactions are automatically processed. Transaction authorization systems may monitor the health of the individual processing nodes and/or the distributed system and automatically adjust the routing of authorizations based on current and/or future performance degradation. The transaction authorization system may also automatically allocate additional resources and/or reroute authorizations to a separate distributed system to avoid performance degradations and continue providing authorizations within the required time period.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
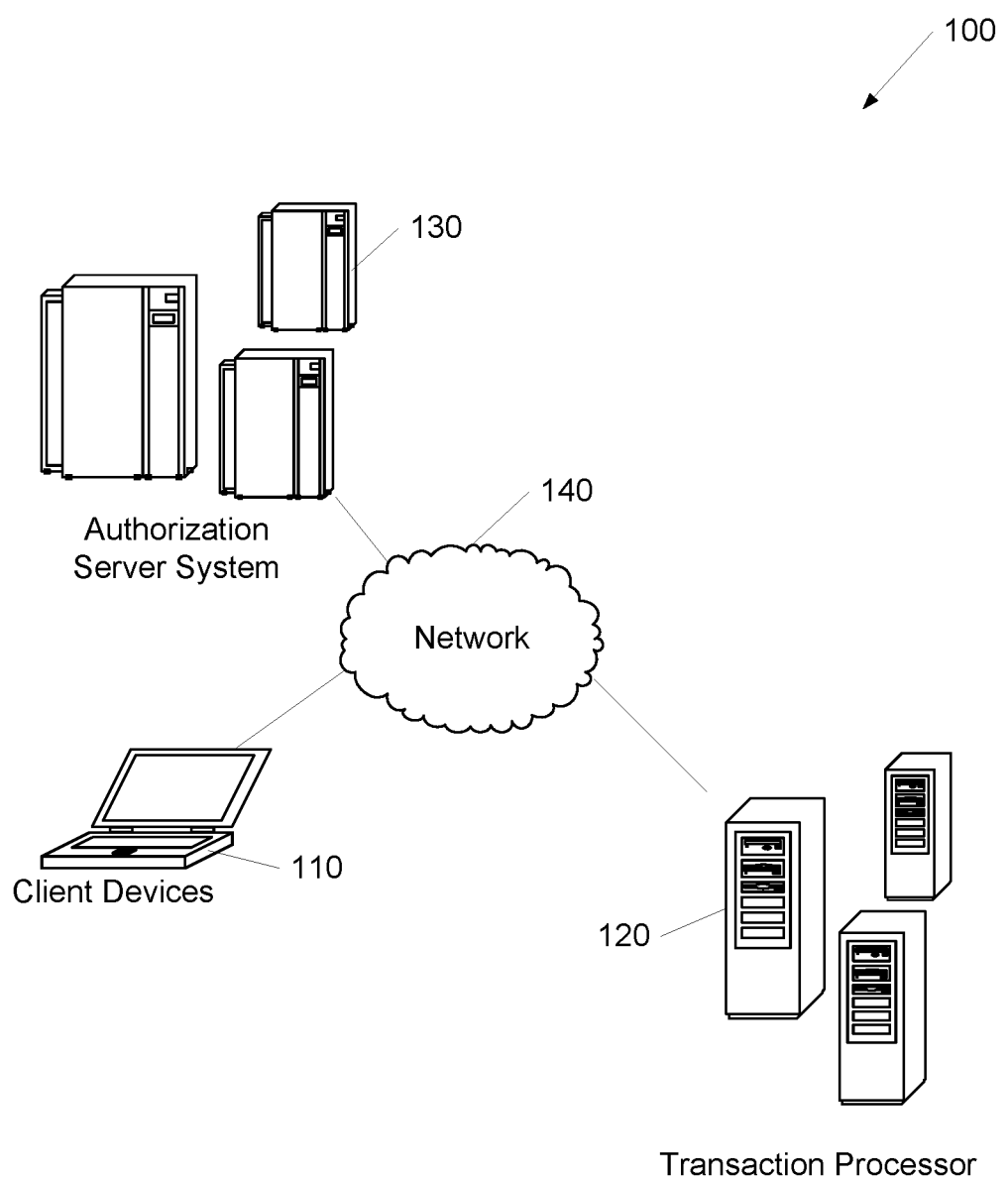
FIG. 1 illustrates an example of a transaction authorization system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein relate to techniques for automatically determining degradation in the performance of a computing system and taking corrective action to mitigate the performance degradation. A variety of transactions, such as credit card transactions, are performed by a transaction processor that obtains transaction requests and facilitates transfers between entities defined in the transaction request. Transaction processors may automatically authorize requested transactions, but in many embodiments, one or more of the entities identified in the transaction may provide authorization for a requested transaction prior to the transaction processor executing the transaction. The transaction processor may enforce a service level agreement, such as a maximum threshold for waiting for an authorization, and automatically execute transactions if an authorization (or denial) for a transaction request is not received within the threshold time. Degradation in the performance of the authorization server system may lead to authorizations not being provided within the required service level agreement, and the corresponding transactions performed without authorization. A variety of authorization server systems are implemented using one or more processing nodes of a distributed system, such as a cloud service provider. However, the performance of the distributed system may be dependent on a variety of factors that are not under the control of the authorization server system, such as network performance issues, regional service unavailability, and/or degradation of node performance.

Transaction authorization systems in accordance with aspects of the invention may process authorizations for a variety of transactions and add resiliency into the transaction authorization system to maintain the ability to authorize transactions even in the event of performance issues in the underlying distributed system. In several embodiments, the authorization server system monitors the health of the individual processing nodes and/or the distributed system and automatically adjusts the routing of authorizations based on current and/or future performance degradation. The transaction authorization system may also allocate additional resources to processing nodes and/or reroute authorizations to a separate distributed system to avoid performance degradations and continue providing authorizations within the required time period.

Existing authorization systems typically take an extended time, often around thirty to forty minutes, to determine when authorizations are not being timely transmitted to a transaction processor and to reroute authorization requests. Transaction authorization systems as described herein may identify performance issues and take corrective action within a few seconds, thereby providing an exponential improvement in the ability of the transaction authorization systems to obtain and process authorization requests.

FIG. 1 illustrates a transaction authorization system 100 in accordance with an embodiment of the invention. The transaction authorization system 100 includes at least one client device 110, at least one transaction processor 120, and/or at least one authorization server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Client devices 110 may determine performance of one or more nodes of a transaction processor 120 and/or provide transaction requests to authorization server system 130 as described herein. Transaction processors 120 may provide authorizations to proceed with processing transactions as described herein. Authorization server systems 130 may receive requests to process transactions, generate authorization requests for the requested transactions, and process the transactions according to a response to an authorization request as described herein. The network 140 may include a local area network (LAN), a wide area network (WAN), a wireless telecommunications network, and/or any other communication network or combination thereof.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or a combination thereof. The data transferred to and from various computing devices in the transaction authorization system 100 may include secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the transaction authorization system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the transaction authorization system 100 in front of one or more computing devices such that any external devices may communicate directly with the specialized hardware.

Figure 2:
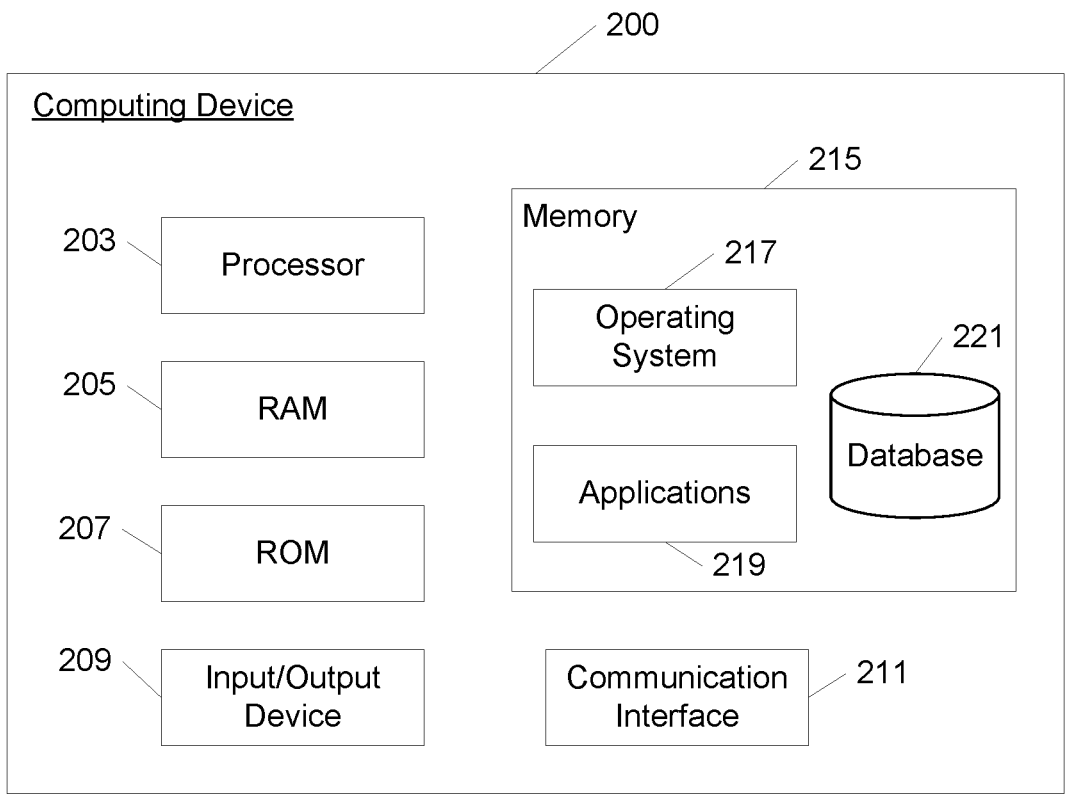
FIG. 2 illustrates an example computing device in accordance with one or more aspects described herein.

Turning now to FIG. 2, a computing device 200 in accordance with an embodiment of the invention is shown. The computing device 200 may include a processor 203 for controlling overall operation of the computing device 200 and its associated components, including RAM 205, ROM 207, input/output device 209, communication interface 211, and/or memory 215. A data bus may interconnect processor (s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
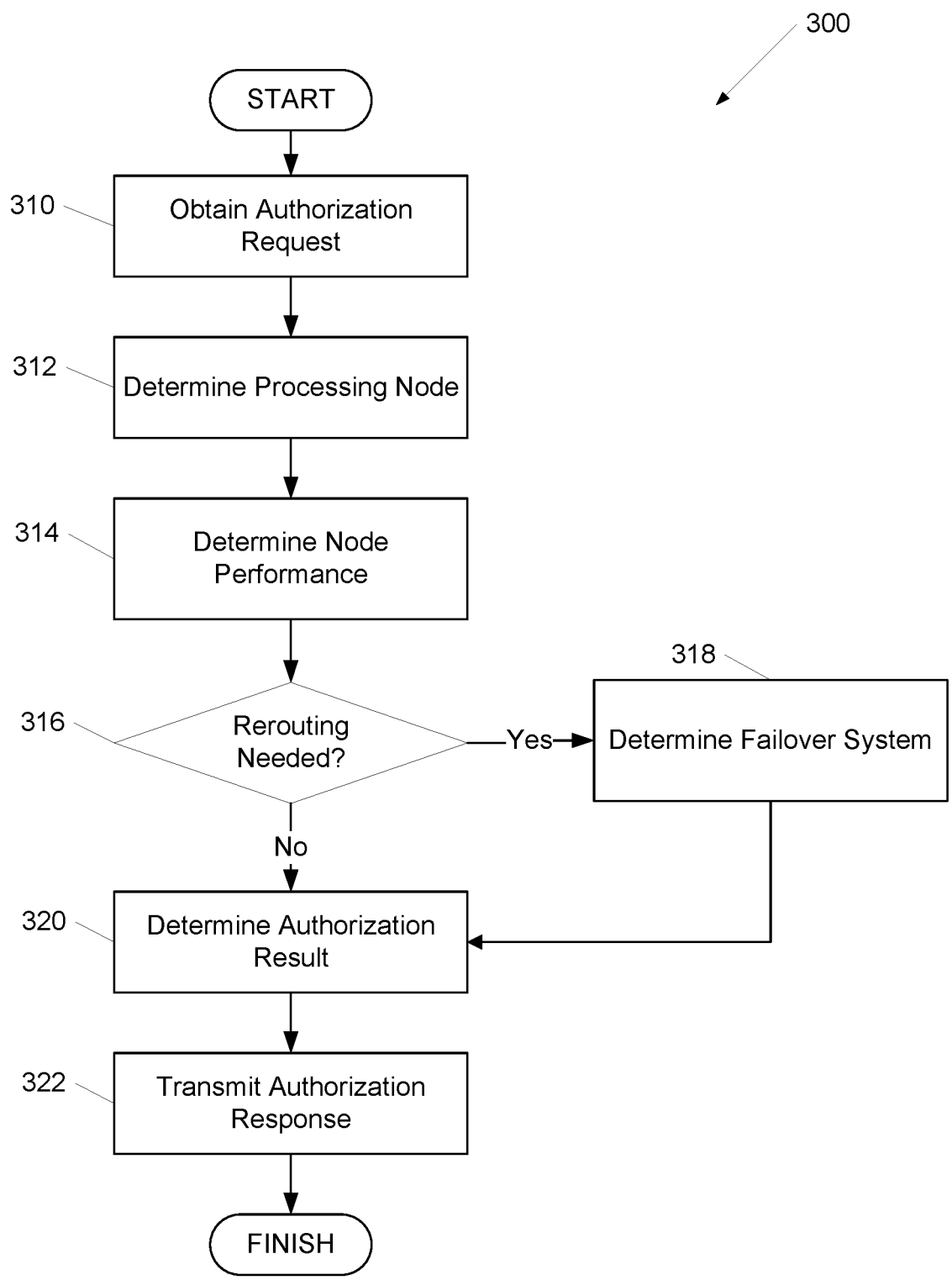
FIG. 3 depicts a flow chart for authorization a transaction according to one or more aspects of the disclosure.

FIG. 3 depicts a flow chart for authorization a transaction according to one or more aspects of the disclosure. Some or all of the steps of process 300 may be performed using any of the computing devices and/or combination thereof described herein. In a variety of embodiments, some or all of the steps described below may be combined and/or divided into sub-steps as appropriate.

At step 310, an authorization request may be obtained. An authorization request may be generated by a transaction processor based on a transaction request provided by a client device. In many embodiments, the authorization request is generated by a client device requesting the transaction be executed. The authorization request may include a transaction identifier, a transaction value, a source entity from which the transaction value is to be provided, a destination entity to which the transaction value is to be sent, a date, a time, an identifier of the party requesting the transaction, an indication of the maximum processing time associated with the authorization request, and/or any other appropriate information.

At step 312, a processing node may be determined. A processing node may include one or more virtual nodes and/or physical nodes of a distributed system hosting an authorization server system. Processing nodes may include geographically distributed computing devices that are in communication with an authorization server system. Request routing data may be used to determine which processing node and/or distributed system will be assigned a particular authorization request. In several embodiments, authorization requests may be transmitted to a distributed system, which then provides the authorization requests to processing nodes hosted by the distributed system. In a number of embodiments, authorization requests may be transmitted directly to a particular processing node. A processing node may have a variety of components including, but not limited to, a message translator that translates authorization requests to and/or from one or more executable tasks for the authorization server system, a decision handler that performs security processing and generates an authorization response for a transaction request, and one or more processing engines that analyze the requested transaction for a variety of quality factors. For example, quality factors for a credit card transaction may include, but are not limited to, fraud detection, available credit, geographic restrictions, and/or transaction size restrictions. However, any quality factors may be used as appropriate to a particular type of transaction and/or transaction value. The quality factors may be expressed as a score and/or probabilistic likelihood as described in more detail herein. A distributed system may also provide a variety of management devices and/or shared memory pools, such as an in-memory data grid, that are accessible by one or more of the processing nodes. The management devices may be used to control the performance of the processing nodes, including creating processing nodes, modifying the operation and/or resource allocation of processing nodes, and/or destroying processing nodes. In a variety of embodiments, a management device may provide a variety of commands to a processing node and/or distributed system to control the operation and/or resource allocation of the processing nodes and/or distributed system. Shared memory pools may be used to store data accessible by one or more processing nodes executing within a particular distributed system and/or between processing nodes executing in distinct distributed systems.

At step 314, node performance may be determined. Node performance may be determined based on a variety of factors including, but not limited to, network performance, request processing time, and/or processing resource availability. The performance of a particular distributed system may be determined based on the performance of one or more processing nodes executing on the distributed system. The performance may be determined based on the historical (and/or current) performance of the processing nodes and/or distributed system and/or be based on the anticipated performance of the processing nodes and/or distributed system. In several embodiments, a processing node and/or distributed system may provide an application programming interface (API) or other interface for providing test data. The test data may be processed in order to determine the node performance. A variety of processes for determining node and system performance are described in more detail with respect to FIG. 4.

At step 316, if rerouting is needed, a failover system may be determined at step 318. In a variety of embodiments, rerouting of an authorization request is needed when a processing node is unable to process the authorization request within a service level agreement associated with the authorization request and/or underlying transaction. A failover system may be a different processing node within the distributed system providing the processing node and/or a processing node provided by a different distributed system. For example, a failover system may be located in the Western time zone, while the determined processing node may be located in the Eastern time zone. Authorization requests may be routed to geographically distinct distributed systems for a variety of reasons, including rerouting authorization requests away from geographic regions that are experiencing a global outage. The performance of the failover system may be determined prior to rerouting authorization requests to the failover system in order to ensure that the failover system will be able to process the authorization requests within the service level agreement. In several embodiments, test data may be provided to an application programming interface provided by the failover system in order to determine the performance of the failover system. A variety of processes for determining failover systems are described in more detail with respect to FIG. 5.

At step 320, an authorization result may be determined. The authorization result may be determined based on one or more quality factors determined for the transaction indicated in the authorization request. In a variety of embodiments, scores for each quality factor may be weighted to determine an overall authorization score for the authorization request. For example, fraud scores and credit limit scores may be accounted a large weight in the calculation of the overall authorization score, while geographic scores may be accounted a lower weight to the overall authorization score. If the authorization score exceeds a threshold value, the authorization request is approved, while the authorization request is denied if the authorization score is below the threshold value. Similarly, a transaction approval may be based on the overall authorization score being below a threshold value, while the transaction may be denied when the overall authorization score is above a threshold value. In several embodiments, the scores are weighted based on the specific quality factor associated with the score. In a variety of embodiments, the scores are weighted based on a probability associated with the score. In a number of embodiments, each score is determined by a different module of the processing node and the authorization result may be determined based on the scores generated within a particular time threshold. This time threshold may be determined based on the service level agreement. For example, if the service level agreement provides 500 ms for the authorization system to provide an authorization response, the processing node may determine the authorization result using the scores available 400 ms after the receipt of the authorization request. The unavailable scores may be assigned a weight of zero.

At step 322, an authorization response may be transmitted. The authorization response may include the authorization result along with any of the information included in the authorization request, such as an identifier of the authorization request, an identifier of the requested transaction, a date, a time, and/or any other data as appropriate. The authorization response may be sent to a transaction processor and/or client device. In a variety of embodiments, the authorization response is written to an in-memory data grid. In several embodiments, the performance of a processing node and/or distributed system may be determined based on the time elapsed between obtaining an authorization request and the time the authorization response is transmitted, received, and/or written to a storage device as described herein.

Figure 4:
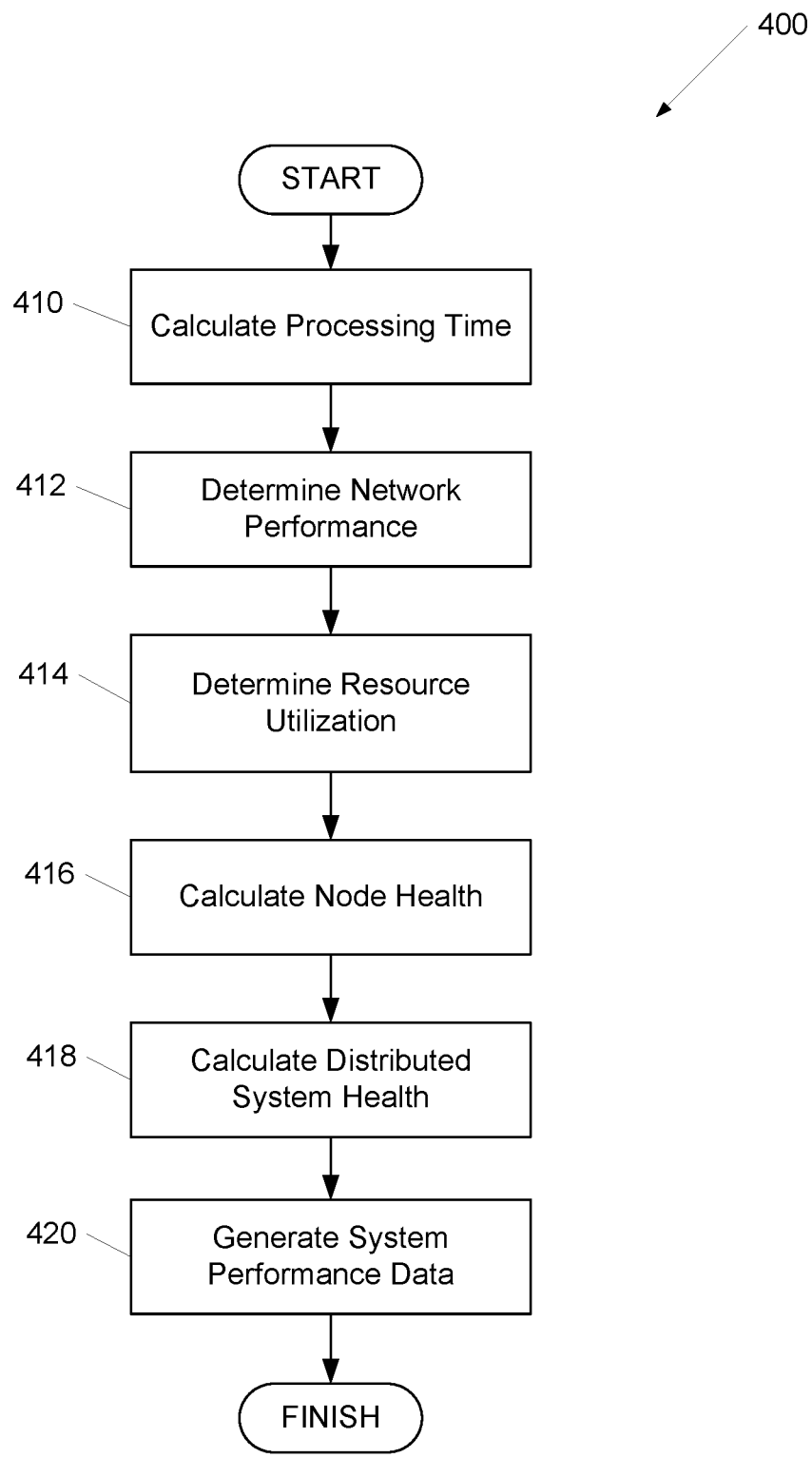
FIG. 4 depicts a flow chart for determining system performance according to one or more aspects of the disclosure.

FIG. 4 depicts a flow chart for determining system performance according to one or more aspects of the disclosure. Some or all of the steps of process 400 may be performed using any of the computing devices and/or combination thereof described herein. In a variety of embodiments, some or all of the steps described below may be combined and/or divided into sub-steps as appropriate.

At step 410, processing time may be calculated. The processing time may be a measure of latency associated with generating an authorization result and/or authorization response for a particular authorization request. The latency may be determined based on a start time and/or end time of the generation of the authorization result. The processing time may be calculated for a particular processing node and/or a distributed network hosting a set of processing nodes. The measured latency may be determined based on the total time to generate the authorization result and/or be determined based on the time to calculate a score for each quality factor and/or the performance associated with each component of the processing node. For example, calculating a fraud score for an authorization request may take 300 ms, while calculating a credit limit score may take 15 ms. The processing time may be calculated by the processing node during the processing of authorization requests and/or a centralized processing node monitoring multiple processing nodes. The processing time may be determined historically (e.g. how much time did it take to process the last five authorization requests) and/or determined based on a statistical trend of processing time. For example, if the processing time for an authorization request has been increasing by five percent every minute for the last five minutes, future processing time may be anticipated to continue increasing based on the trend in past increase in processor utilization. In a number of embodiments, the total time to process a future authorization request may be predicted based on the historical processing time. In a variety of embodiments, one or more machine classifiers may be used to calculate anticipated processing time(s) for a processing node and/or a probabilistic likelihood that the processing node will be able to process a request in the anticipated processing time(s). A variety of machine classifiers may be used to calculate future processing time performance including, but not limited to, decision trees, k-nearest neighbors, support vector machines (SVM), neural networks (NN), recurrent neural networks (RNN), convolutional neural networks (CNN), and/or probabilistic neural networks (PNN). RNNs may further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers may be utilized, more specific machine classifiers when available, and general machine classifiers at other times may further increase the accuracy of predictions. Aspects described herein may be used with any type of neural network structure, and for any suitable application, particularly where a maximum likelihood objective is used during training.

At step 412, network performance may be determined. The performance of a network connection may be determined based on network availability, total bandwidth, throughput, latency, packet loss, jitter, error rate, and/or any other factors as appropriate. The network performance may be measured for a particular processing node, a set of processing nodes, and/or the distributed system hosting the processing nodes. For example, the network connection serving the distributed system may be performing normally while a particular processing node hosted by the distributed system may be experiencing degraded network performance due to a misconfiguration, lack of available resources, and/or error in the underlying network device associated with a virtual network device used by the processing node. In another example, every processing node hosted by a distributed system may experience diminished network performance based on a regional Internet outage affecting the geographic area in which the distributed system is physically located. The network performance may be determined by the processing node and/or a network monitoring device as appropriate. The network utilization may be determined historically (e.g. the measured bandwidth and latency of the network in the past five minutes) and/or determined based on a statistical trend of network performance. For example, if the total latency of the network has increased by 500 ms in the last thirty seconds, a trend that the network latency may continue to increase may be determined. In a number of embodiments, one or more machine classifiers may be used to calculate the anticipated network performance for a processing node and/or a probabilistic likelihood that the processing node will experience the anticipated network performance.

At step 414, resource utilization may be determined. Resource utilization may be determined on a per-processing node basis and/or for a distributed system. Resource utilization may be determined based on processor usage (overall and/or per-core), memory usage, disk usage, total thread count, power usage, and/or any other factor as appropriate. In a number of embodiments, resource utilization is based on an amount of memory available in an in-memory data grid accessible by one or more processing nodes. The resource utilization may be determined over a period of time (e.g. an average utilization between a start time and an end time) and/or at a particular time. Resource utilization may also be determined based on the number of processing nodes and other services hosted by the distributed system. For example, a distributed system may host a set of five processing nodes and six instances of an in-memory data grid. The resource utilization may be determined by the processing node and/or a monitoring device as appropriate. For example, a monitoring device may monitor a distributed system to determine the number of processing nodes and the health of the in-memory data grid. The resource utilization may be determined historically (e.g. how much processor time has been used over the last two seconds) and/or determined based on a statistical trend of resource utilization. For example, if the processor utilization has been increasing by five percent every minute for the last five minutes, future processor utilization may be anticipated based on the trend in past increase in processor utilization. In many embodiments, one or more machine classifiers may be used to calculate the anticipated resource utilization for a processing node and/or a probabilistic likelihood that the processing node will experience the anticipated resource utilization.

At step 416, node health may be calculated. Node health may be calculated based on the calculated processing time, determined network performance, and/or determined resource utilization. For example, a processing node may be determined to be unhealthy (and therefore unavailable to process transactions) when at least one percent of authorization requests transmitted to the processing node are not processed within the defined service level agreement. In a number of embodiments, the processing time, network performance, and/or resource utilization for a processing node are expressed using a score and the node health may be calculated as a weighted function of these scores. In several embodiments, the processing time, network performance, and/or resource utilization are expressed as a binary flags and the node health is determined based on each of the flags. For example, if any of these factors are flagged as failing, the node health for the processing node may be determined to be unhealthy. In many embodiments, node health may be calculated using one or more machine classifiers. The machine classifiers may generate an indication of the health of the processing node along with a probabilistic likelihood that the generated node health is correct. The node health may be calculated as a current health and/or as a future health. For example, it may be predicted that a processing node will no longer be able to process an authorization request within a specified service level agreement ten minutes into the future. Additional authorization requests may be assigned to the processing node for nine minutes before the processing node is no longer assigned authorization requests as described herein.

At step 418, the health of a distributed system may be calculated. The health of the distributed system may be calculated based on the health of each processing node hosted by the distributed system and/or the processing time, network performance, and/or resource utilization of the distributed system itself. For example, a distributed system may be expected to host a certain number of processing nodes, each with a particular number of processing cores, memory, and storage allocated to each processing node. In a variety of embodiments, the processing node health, processing time, network performance, and/or resource utilization are expressed using a score and the distributed system health may be calculated as a weighted function of these scores. In several embodiments, the processing node health, processing time, network performance, and/or resource utilization are expressed as a binary flags and the distributed system health is determined based on each of the flags. For example, if all of these factors are flagged as healthy, the distributed system may be determined to be healthy. In many embodiments, distributed system health may be calculated using one or more machine classifiers. The machine classifiers may generate an indication of the health of the distributed system along with a probabilistic likelihood that the generated distributed system health is correct as described herein. For example, it may be predicted that a distributed system will no longer be able to provide adequate networking resources to a set of processing nodes so the nodes may obtain an authorization request in the next five minutes. In this example, future authorization requests may be redirected to processing nodes hosted by a second distributed system that are not affected by the predicted network resource issues as described in more detail herein.

At step 420, system performance data may be generated. The system performance data may be generated based on the calculated node health and/or calculated distributed system health. The system performance data may be used to determine if and/or when authorization requests should be provided to a particular processing node and/or rerouted to a different processing node, either hosted by the same distributed system and/or a different distributed system, as described in more detail herein.

Figure 5:
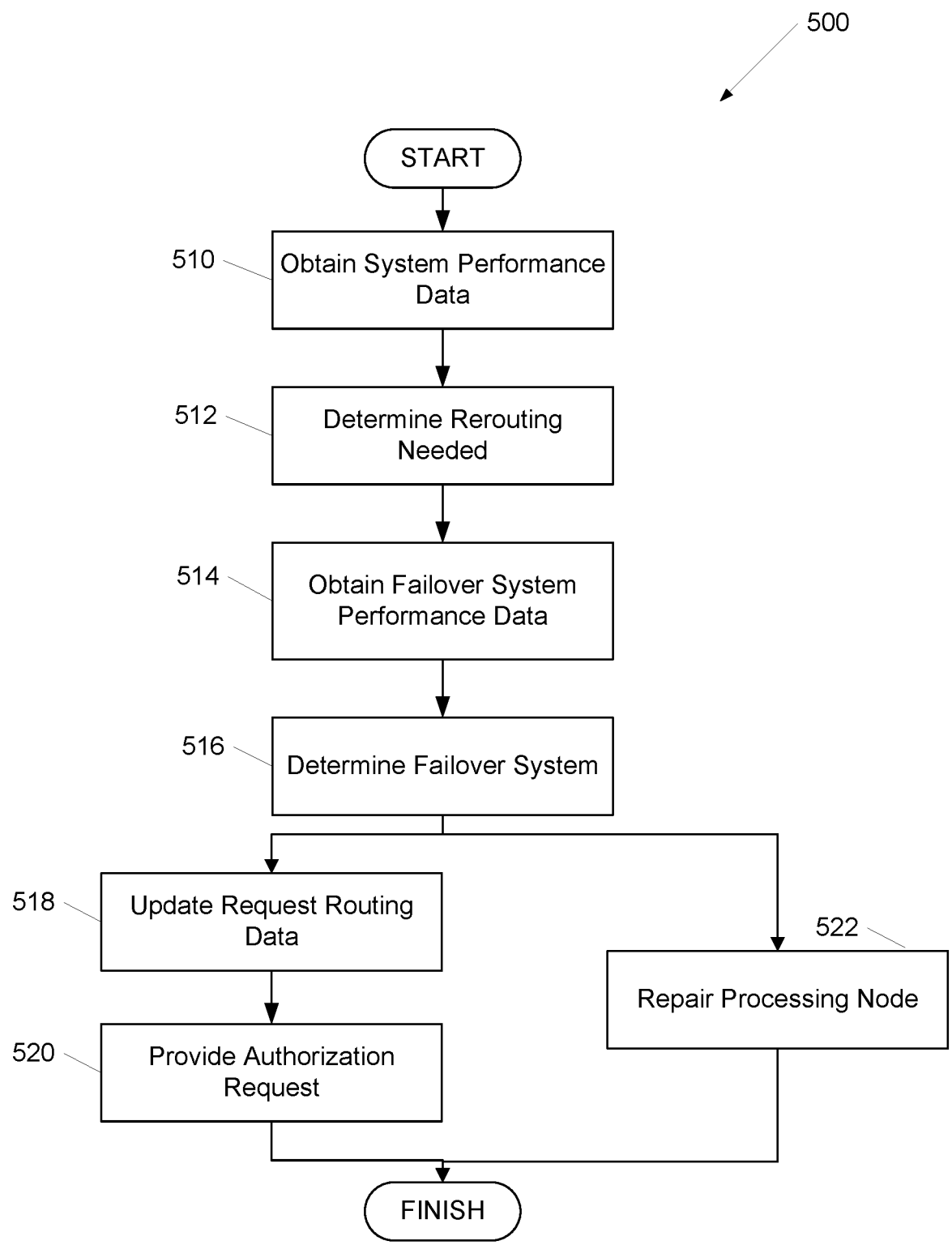
FIG. 5 depicts a flow chart for rerouting an authorization request according to one or more aspects of the disclosure.

FIG. 5 depicts a flow chart for rerouting an authorization according to one or more aspects of the disclosure. Some or all of the steps of process 500 may be performed using any of the computing devices and/or combination thereof described herein. In a variety of embodiments, some or all of the steps described below may be combined and/or divided into sub-steps as appropriate.

At step 510, system performance data may be obtained. The system performance data may be obtained from a monitoring device, a processing node, and/or distributed system. The system performance data may be generated as described herein. The system performance data may indicate a historical performance of a processing node and/or distributed system and/or an anticipated future performance of a processing node and/or distributed system.

At step 512, a determination may be made that rerouting is needed. Rerouting may be needed when the system performance data indicates that a particular processing node and/or distributed system is unable to process authorization requests within a specific service level agreement. The inability to process authorization requests may be immediate (e.g. if a processing node has failed to process a certain percentage of authorization requests in a particular time frame and/or a distributed system is experiencing network issues) and/or predictive (e.g. it is predicted that a processing node will be unable to process future authorization requests within the service level agreement based on one or more trends in the performance of the processing node). The rerouting determination may be a rerouting between processing nodes on a particular distributed system and/or between processing nodes on different distributed systems. In several embodiments, the different distributed systems are located in distinct geographic regions such that an outage affecting the geographic region in which the first distributed system is located does not affect the geographic region in which the second distributed system is located.

At step 514, failover system performance data may be obtained. A failover system may be the processing node and/or distributed system to which future authorization requests are to be routed. The failover system performance may be determined as described herein for one or more candidate failover systems. In a variety of embodiments, the failover system performance may be determined based on test data, such as a test authorization request, that is provided to the failover system to cause the failover system to determine performance data as described herein. The performance of a candidate failover system may be determined in order to avoid rerouting authorization requests to a processing node and/or distributed system that is also unable to process the authorization requests within the service level agreement.

At step 516, a failover system may be determined. The failover system may be determined based on the performance data for the set of candidate failover systems. In several embodiments, the failover system with the best expected performance may be determined to be the failover system. In a number of embodiments, the failover system is determined based on a probabilistic likelihood that the failover system will experience performance degradation being experienced (and/or predicted to be experienced) by the processing node and/or distributed system. For example, if it is predicted that a distributed system will experience a network outage affecting every processing node hosted by the distributed system, the failover system may be selected based on the likelihood that the failover system will not be affected by the upcoming network outage.

At step 518, request routing data may be updated. The request routing data may be used to determine which distributed system and/or processing node will be assigned a particular authorization request. The request routing data may include a routing table (or any other data structure) indicating a network address to which data (e.g. authorization requests) may be transmitted. The request routing data may include addresses of distributed systems and/or individual processing nodes. Updating the request routing data may include adding addresses of the failover system(s) and/or removing addresses of processing nodes and/or distributed systems experiencing degraded performance.

At step 520, an authorization request may be provided. Providing an authorization request may include transmitting the authorization request to the determined failover system for processing. In several embodiments, a notification that authorization requests are being rerouted may be generated and transmitted to any of a variety of computing devices. The notification data may cause one or more computing devices to automatically reallocate resources and/or otherwise take corrective action to restore a processing node and/or distributed system to operation performance as described herein.

At step 522, a processing node may be repaired. In a variety of embodiments, when authorization requests are rerouted from a processing node and/or distributed system, the processing node and/or distributed system may be taken offline, rebooted, destroyed, and/or any other actions as appropriate to correct the performance degradation experienced by the processing node and/or distributed system. Command messages may be sent to a processing node based on one or more performance metrics related to the health of the processing node, such as network performance, resource utilization, processing time, and/or node health. Command messages may be transmitted to a distributed system, processing node, and/or other management device in order to cause particular actions and/or resource allocation to be performed. The actions and/or resource allocation may be corrective actions to improve the performance of the processing node and/or distributed system. The particular actions may be based on the specific performance metrics causing authorization requests to be rerouted from the processing node and/or distributed system. For example, additional processing resources, such as processor cores, RAM, and/or storage, may be allocated to a processing node by the distributed system hosting the processing node to improve the performance of the processing node. In several embodiments, the command message causing the additional processing resources to be allocated may be generated based on a performance metric indicating that the processing time for the processing node to process an authorization request exceeds a threshold time. In a variety of embodiments, the command message may be generated based on a performance metric indicating that the resource utilization of the processing node exceeds a threshold utilization. In several embodiments, if only one processing node is being hosted by a distributed system, the processing node will continue to be sent authorization requests even when the performance of the processing node does not meet the service level agreement. In a number of embodiments, the performance of processing nodes and/or distributed systems may continue to be determined after rerouting authorization requests to a failover system. When the performance of the processing nodes and/or distributed systems recovers, the processing nodes and/or distributed systems may be re-added to the request routing data.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
    obtaining an authorization request;
    determining a maximum response time based on the authorization request;
    transmitting, to a processing node in a set of processing nodes, the authorization request;
    obtaining, from the processing node, response data based on the authorization request;
    calculating a response time associated with the response data;
    obtaining a second authorization request;
    determining that the response time exceeds the maximum response time;
    determining at least one factor causing the response time to exceed the maximum response time;
    generating, based on the at least one factor, a command message comprising instructions to reconfigure the processing node;
    transmitting the command message to a management device, wherein the command message causes the management device to modify the processing node; and
    processing the second authorization request using the processing node once the processing node has been modified.

2. The computer-implemented method of claim 1, further comprising calculating the response time associated with generating the response data by the processing node by:
    transmitting, to the processing node and at a first time, test data via an application programming interface (API) provided by the processing node;
    obtaining, at a second time, test response data generated based on the test data; and
    determining the response time based on a difference between the first time and the second time.

3. The computer-implemented method of claim 1, further comprising calculating the response time associated with generating the response data by the processing node by:
    transmitting, to the processing node, test data via an application programming interface (API) provided by the processing node;
    obtaining test response data generated based on the test data; and
    determining the response time based on status information of the processing node indicated in the response data.

4. The computer-implemented method of claim 3, wherein the status information is selected from the group consisting of an indication of a number of transactions processed by the processing node in a predetermined time frame, an indication of a latency for completing a write operation by the processing node, and an indication of an amount of free memory available in an in-memory data grid shared by each processing node in the set of processing nodes.

5. The computer-implemented method of claim 1, wherein the command message causes the management device to restart the processing node.

6. The computer-implemented method of claim 1, wherein the command message causes the management device to destroy the processing node.

7. The computer-implemented method of claim 1, wherein the command message causes the management device to allocate additional processing resources to the processing node.

8. The computer-implemented method of claim 1, further comprising:
    determining a first geographic location associated with the processing node when the response time exceeds the maximum response time;
    selecting a second processing node based on the second processing node being associated with a second geographic location distinct from the first geographic location; and
    transmitting the second authorization request to the second processing node.

9. A computing device, comprising:
    one or more processors; and
    memory storing instructions that, when executed by the one or more processors, cause the computing device to:
        obtain an authorization request;

determine a maximum response time based on the authorization request;
transmit, to a processing node in a set of processing nodes, the authorization request;
obtain, from the processing node, response data based on the authorization request;
calculate a response time associated with the response data;
obtain a second authorization request;
determine that the response time exceeds the maximum response time:
determine at least one factor causing the response time to exceed the maximum response time;
generate, based on the at least one factor, a command message comprising instructions to reconfigure the processing node;
transmit the command message to a management device, wherein the command message causes the management device to modify the processing node; and
process the second authorization request using the processing node once the processing node has been modified.

10. The computing device of claim 9, wherein the instructions, when executed by the one or more processors, further cause the computing device to calculate the response time associated with generating the response data by the processing node by:
transmitting, to the processing node and at a first time, test data via an application programming interface (API) provided by the processing node;
obtaining, at a second time, test response data generated based on the test data; and
determining the response time based on a difference between the first time and the second time.

11. The computing device of claim 9, wherein the instructions, when executed by the one or more processors, further cause the computing device to calculate the response time associated with generating the response data by the processing node by:
transmitting, to the processing node, test data via an application programming interface (API) provided by the processing node;
obtaining test response data generated based on the test data; and
determining the response time based on status information of the processing node indicated in the response data.

12. The computing device of claim 11, wherein the status information is selected from the group consisting of an indication of a number of transactions processed by the processing node in a predetermined time frame, an indication of a latency for completing a write operation by the processing node, and an indication of an amount of free memory available in an in-memory data grid shared by each processing node in the set of processing nodes.

13. The computing device of claim 9, wherein the command message causes the management device to perform an action selected from the group consisting of restarting the processing node, destroying the processing node, and allocating additional resources to the processing node.

14. The computing device of claim 9, wherein the instructions, when executed by the one or more processors, further cause the computing device to:
determine a first geographic location associated with the processing node when the response time exceeds the maximum response time;
select a second processing node based on the second processing node being associated with a second geographic location distinct from the first geographic location; and
transmit the second authorization request to the second processing node.

15. A non-transitory machine-readable medium storing instructions that, when executed by one or more processors, cause the one or more processors to perform steps comprising:
obtaining an authorization request;
determining a maximum response time based on the authorization request;
transmitting, to a processing node in a set of processing nodes, the authorization request;
obtaining, from the processing node, response data based on the authorization request;
calculating a response time associated with the response data;
obtaining a second authorization request;
determining that the response time exceeds the maximum response time:
determining at least one factor causing the response time to exceed the maximum response time;
generating, based on the at least one factor, a command message comprising instructions to reconfigure the processing node;
transmitting the command message to a management device, wherein the command message causes the management device to modify the processing node; and
processing the second authorization request using the processing node once the processing node has been modified.

16. The non-transitory machine-readable medium of claim 15, wherein the instructions further cause the one or more processors to calculate the response time associated with generating the response data by the processing node by performing steps comprising:
transmitting, to the processing node and at a first time, test data via an application programming interface (API) provided by the processing node;
obtaining, at a second time, test response data generated based on the test data; and
determining the response time based on a difference between the first time and the second time.

17. The non-transitory machine-readable medium of claim 15, wherein the instructions further cause the one or more processors to calculate the response time associated with generating the response data by the processing node by performing steps comprising:
transmitting, to the processing node, test data via an application programming interface (API) provided by the processing node;
obtaining test response data generated based on the test data; and
determining the response time based on status information of the processing node indicated in the response data.

18. The non-transitory machine-readable medium of claim 17, wherein the status information is selected from the group consisting of an indication of a number of transactions processed by the processing node in a predetermined time frame, an indication of a latency for completing a write operation by the processing node, and an indication of an amount of free memory available in an in-memory data grid shared by each processing node in the set of processing nodes.

19. The non-transitory machine-readable medium of claim 15, wherein the command message causes the management device to perform an action selected from the group consisting of restarting the processing node, destroying the processing node, and allocating additional resources to the processing node.

20. The non-transitory machine-readable medium of claim 15, wherein the instructions further cause the one or more processors to perform steps comprising:
- determining a first geographic location associated with the processing node when the response time exceeds the maximum response time;
- selecting a second processing node based on the second processing node being associated with a second geographic location distinct from the first geographic location; and
- transmitting the second authorization request to the second processing node.

* * * * *